United States Patent Office 3,051,648
Patented Aug. 28, 1962

3,051,648
STABILITY OF HYDROCARBON DISTILLATE
Frederick G. Hess, Cranbury, and Walter C. Bradbury, Union, N.J., assignors to Cities Service Research and Development Company, New York, N.Y., a corporation of New Jersey
No Drawing. Filed Apr. 29, 1960, Ser. No. 25,565
8 Claims. (Cl. 208—297)

This invention relates to the catalytic treatment of hydrocarbons and more particularly relates to a novel process for improving the stability of hydrocarbon distillate.

Hydrocarbon distillate fuels treated in accordance with the present invention include generally fuels having boiling ranges between about 100 and about 1200° F. and may include gasolene, kerosene, diesel fuels, heating fuels, jet fuels and the like. Such distillates may be obtained from any suitable source such as by fractionation of crude oils or may be obtained from any of the various hydrocarbon conversion or refining processes commonly used in the treatment of hydrocarbon oils. Such processes include, for instance, catalytic or thermal cracking or reforming, coking, alkylation, polymerization and the like. The process of the present invention is especially applicable to kerosene and to fuel mixtures containing substantial portions of kerosene. Fuels containing substantial amounts of kerosene include, for instance, jet fuels which frequently contain from 30 to 60 volume percent or more of kerosene and frequently have boiling ranges between about 100 and 600° F. The invention is also applicable to fuel compositions containing substantial amounts, such as at least 30 volume percent, of hydrocarbon distillates of the type described above.

Distillates such as those described above have a strong tendency to form gums and sediments, especially after prolonged periods of storage or exposure to high temperatures. Such gums and sediments are highly undesirable and may clog fuel lines, valves, meters, filters, etc., as well as form deposits in internal combustion engines or fuel burners. In order to prevent the formation of such sediment and gums for as long a period as possible, various additives or inhibitors are commonly added to distillate fuels. While the use of such additives has proved effective in substantially increasing the stability of distillate fuels by preventing the formation of sediment or gums for substantial periods of time, such additives are expensive and are not always as effective as might be desired.

It is an object of the present invention to provide a method of treating hydrocarbon distillate fuels to improve the stability thereof.

It is another object of the invention to provide a novel process for improving the stability of hydrocarbon distillate fuels without the use of additives.

In accordance with a preferred embodiment of the present invention, hydrocarbon distillate fuel is treated for improvement of stability by contacting the same in the liquid phase at a temperature of at least about 400° F. with a supported aluminum phosphate catalyst.

The aluminum phosphate catalyst with which hydrocarbon distillate is treated in accordance with the invention is preferably supported on suitable supporting material such as silica gel or neutral clay in order to increase the effective surface area of the catalyst which is available for treatment of the hydrocarbon distillate. The aluminum phosphate catalyst may be present on the supporting material in any suitable quantities such as between about 0.5 and about 10 weight percent based on aluminum phosphate. In order to assist in distributing the aluminum phosphate over as large a surface area as possible it is preferred that the supporting material be finely divided with material capable of passing through a 10 mesh or smaller screen being preferred. Material of 10 to 50 mesh size is especially suitable. A suitable catalyst may be prepared by wetting fine silica gel with a concentrated solution of aluminum sulfate and then treating with an excess of ammonium hydroxide to precipitate aluminum hydroxide. Phosphoric acid may then be added to form aluminum phosphate and the catalyst may then be water washed and dried to remove water.

It is preferred that the treatment of hydrocarbon distillate in accordance with the present invention be carried out in the absence of water in order to prevent the catalyst from becoming dissolved in water and being thereby dissociated into free ions. The treatment may be carried out under any suitable conditions of temperature and pressure, but it is preferred that the distillate being treated be maintained in the liquid phase and be treated at a temperature above about 400° F., preferably between about 450° and about 600° F. Any suitable pressures may be used, but pressures sufficient to maintain the distillate in the liquid phase are preferred. Temperatures between about 450° and about 600° F. and pressures of between about 5 and about 200 p.s.i. have been found to be suitable although higher pressures may, of course, be used.

The mechanism by which stability of hydrocarbon distillate fuels is increased by the treatment of the present invention is not completely understood, but it is believed that such improved stability is the result of the removal of undesirable sulfur compounds as well as the removal of other undesirable compounds such as certain oxygen and nitrogen compounds by the catalytic action of the aluminum phosphate catalyst.

In treating distillate fuels in accordance with the present invention it is preferred to follow the catalytic treatment of the invention with a caustic or clay neutralizing treatment in accordance with the conventional refining practice. If desired, the distillate fuel treated in accordance with the invention may also have been sweetened for removal of obnoxious sulfur compounds by conventional processes such as with a doctor solution or with an alkaline hypchlorite such as sodium hypochlorite. It is also contemplated that the distillate may be sweetened following the catalytic treatment of the present invention.

The following specific examples will illustrate the application and benefits of the present invention in the treatment of hydrocarbon distillate.

EXAMPLE 1

In order to evaluate the treatment of the present invention a suitable catalyst was prepared by wetting 255 grams of 14–20 mesh silica gel with a concentrated aqueous solution of aluminum sulfate containing 16 grams of $Al_2(SO_4)_3 \cdot 18H_2O$. This was then treated with a slight excess of dilute ammonium hydroxide solution to precipitate aluminum hydroxide. After water washing, phosphoric acid was added to form aluminum phosphate. After washing with water to remove excess phosphoric acid, the silica gel was dried in an oven and then heated in a muffle furnace at 930° F. for 1 hour.

The kerosene treated with this catalyst had the following properties prior to treatment:

ASTM distillation:
| | | |
|---|---|---|
| IBP | °F | 322 |
| 10% evap | °F | 366 |
| 20% evap | °F | 389 |
| 30% evap | °F | 398 |
| 40% evap | °F | 407 |
| 50% evap | °F | 419 |
| 60% evap | °F | 427 |
| 70% evap | °F | 438 |
| 80% evap | °F | 450 |
| 90% evap | °F | 469 |
| Max. | °F | 501 |
| Recovered | percent | 97 |
| Residue | do | 2 |
| Loss | do | 1 |
| Gravity | °API | 44.2 |
| Freezing point | °F | −50.4 |

Gums:
| | | |
|---|---|---|
| Existent | percent | 2.0 |
| Potential | do | 2.8 |
| Sulfur | wt. percent | 0.07 |

FIA analysis:
| | | |
|---|---|---|
| Aromatic | do | 14.0 |
| Olefin | do | 0.3 |
| Saturates | do | 85.7 |
| Naphthalenes | do | 2.38 |
| Smoke point (min.) | | 25 |

A reactor measuring ½ inch in diameter by 18 inches long was filled with the catalyst described above and the kerosene described above was treated by passing the same through the reactor at an inlet temperature of 500° F. at the rate of 51 milliliters per minute. The pressure was regulated between 50 and 125 p.s.i.g. by means of a spring loaded valve. The hot distillate coming from the reactor was then passed through a cooler. The product from this treatment was sour to the doctor test and was yellow in color. It was, therefore, sweetened by means of doctor solution and sulfur at 130° F. This was followed by treatment with 1 lb. per barrel of fine Attapulgus clay.

The treated product obtained as described above was then tested for stability by means of the standard CFR coker test. In this test the thermal stability of a distillate fuel is measured by heating the fuel to 400° F. while passing the fuel through a conduit surrounding a coaxial inner tube. The color of the inner tube following the test is then compared with a standard color chart to determine the deposit rating of the fuel. A deposit rating of 0 signifies a clear color and correspondingly high stability fuel while increasing deposit ratings up to 4 signify increasing discoloration of the tube and correspondingly lower stability of the fuel tested. During the CFR coker test the distillate being tested is passed through a standard filter at a temperature of 500° F. following passage through the conduit described above and the pressure drop across the filter is measured and considered as another measure of stability with relatively higher pressure drops indicating deposits of gums and sediments and, therefore, lower stability. The results of the CFR coker test on the kerosene treated with aluminum phosphate catalyst as described above are shown in Table I below.

EXAMPLE 2

In order to provide a comparison as to the effectiveness of the treatment described above, a control sample of the same kerosene used in the run described above was doctor sweetened, clay treated and subjected to the CFR coker test described above, but was not treated with aluminum phosphate or any other catalyst. The results of the CFR coker test on this control sample of kerosene are shown in Table I below.

*Table I*

RESULTS OF CFR COKER TEST

| Run | Pressure Difference (in. Hg) | Deposit Rating | Time (min.) |
|---|---|---|---|
| Control | 25.0 | 3 | 108 |
| Example 1 | 0 | 0 | 300 |

From Table I it is clear that the treatment of the present invention is extremely effective in increasing the stability of hydrocarbon distillate fuels. It will be noted that the control sample of kerosene which was not treated with aluminum phosphate catalyst produced a pressure difference of 25.0 inches of mercury across the filter and a deposit rating of 3 during a CFR coker test of only 108 minutes while the kerosene which was treated in accordance with the invention as described above produced substantially no pressure drop across the filter and a deposit rating of 0 during a CFR coker test of 300 minutes duration. These results make it clear not only that the thermal stability of the fuel is substantially increased by treatment in accordance with the present invention, but also that such treatment produces distillate fuel entirely suitable for commercial use. Furthermore, such treatment appears to be more economical than conventional acid treatment in improving the stability of hydrocarbon distillates.

While the invention has been described above with respect to certain preferred embodiments, thereof, it will be understood by those skilled in the art that various changes and modifications may be made without departing from the spirit and scope of the invention and it is intended that all such changes and modifications be covered by the appended claims.

We claim:
1. The process for improving the stability of hydrocarbon distillate fuel which comprises contacting the same in the liquid phase in an anhydrous atmosphere with a supported aluminum phosphate catalyst.
2. The process for improving the stability of hydrocarbon distillate fuel which comprises contacting the same in the liquid phase in an anhydrous atmosphere at a temperature of at least about 400° F. with a supported aluminum phosphate catalyst.
3. The process for improving the thermal stability of hydrocarbon distillate fuel which comprises contacting the same in the liquid phase in an anhydrous atmosphere at a temperature between about 450° and about 600° F. with a supported aluminum phosphate catalyst.
4. The process for improving the thermal stability of a hydrocarbon base fuel comprising at least about 30 volume percent kerosene which comprises contacting the same in the liquid phase in an anhydrous atmosphere at a temperature of at least about 400° F. with a supported aluminum phosphate catalyst.
5. The process for improving the thermal stability of a hydrocarbon base fuel comprising at least about 30 volume percent kerosene which comprises contacting the same in the liquid phase in an anhydrous atmosphere at a temperature greater than about 400° F. with a catalyst comprising between about 0.5 and about 10 weight percent aluminum phosphate deposited on an inert carrier.
6. The process for improving the stability of a hydrocarbon base fuel comprising at least about 30 volume percent kerosene which comprises contacting the same in the liquid phase in an anhydrous atmosphere at a temperature between about 450° and about 600° F. and a pressure between about 5 and about 200 p.s.i.g. with a catalyst comprising between about 0.5 and about 10 weight percent aluminum phosphate deposited on silica gel.

7. The process for improving the thermal stability of hydrocarbon distillate fuel which comprises contacting the same in the liquid phase in an anhydrous atmosphere at a temperature between about 450° and about 600° F. and a pressure between about 5 and about 200 p.s.i.g. with a catalyst comprising between about 0.5 and about 10 weight percent aluminum phosphate on silica gel.

8. The process for improving the thermal stability of kerosene which comprises contacting the same in the liquid phase in an anhydrous atmosphere at a temperature between about 450° and about 600° F. and a pressure between about 5 and about 200 p.s.i.g. with a catalyst comprising between about 0.5 and about 10 weight percent aluminum phosphate on an inert support.

References Cited in the file of this patent

UNITED STATES PATENTS

| | | |
|---|---|---|
| 1,826,145 | Lachman | Oct. 6, 1931 |
| 1,947,869 | Morrell et al. | Feb. 20, 1934 |
| 2,104,791 | Craig | Jan. 11, 1938 |
| 2,646,390 | Arnold et al. | July 21, 1953 |
| 2,666,021 | Milson | Jan. 12, 1954 |
| 2,872,413 | Elliott et al. | Feb. 3, 1959 |